United States Patent

Gress et al.

(10) Patent No.: US 7,959,212 B2
(45) Date of Patent: Jun. 14, 2011

(54) WELDED BLANK FOR VEHICLE DOOR PANEL

(75) Inventors: Jeffrey J. Gress, Royal Oak, MI (US); Venkat Aitharaju, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 12/331,678

(22) Filed: Dec. 10, 2008

(65) Prior Publication Data

US 2010/0045066 A1 Feb. 25, 2010

Related U.S. Application Data

(60) Provisional application No. 61/090,741, filed on Aug. 21, 2008.

(51) Int. Cl.
*B60J 5/04* (2006.01)

(52) U.S. Cl. .................................... 296/146.5; 49/502

(58) Field of Classification Search ................ 49/502; 296/146.5

See application file for complete search history.

(56) References Cited

U.S. PATENT DOCUMENTS

| | | | |
|---|---|---|---|
| 5,056,849 A * | 10/1991 | Norris et al. | 296/65.05 |
| 6,261,701 B1 * | 7/2001 | Fields, Jr. | 428/577 |
| 6,513,860 B1 * | 2/2003 | Ourchane et al. | 296/146.5 |
| 7,033,454 B2 * | 4/2006 | Dunneback | 156/182 |
| 2003/0085562 A1 * | 5/2003 | Sparling | 280/789 |
| 2003/0204945 A1 * | 11/2003 | Lyons | 29/428 |
| 2004/0110437 A1 * | 6/2004 | Dunneback | 442/2 |
| 2004/0129690 A1 * | 7/2004 | Schroth et al. | 219/137 WM |
| 2004/0251711 A1 * | 12/2004 | Walther | 296/146.5 |
| 2005/0189790 A1 * | 9/2005 | Chernoff et al. | 296/193.05 |
| 2006/0033347 A1 * | 2/2006 | Hauger et al. | 293/133 |
| 2006/0097549 A1 * | 5/2006 | Fischer et al. | 296/203.03 |
| 2008/0163556 A1 * | 7/2008 | Witte | 49/502 |

FOREIGN PATENT DOCUMENTS

| | | | |
|---|---|---|---|
| EP | 1149719 A2 | * | 10/2001 |
| JP | 51005248 A | * | 1/1976 |
| JP | 11104750 A | * | 4/1999 |
| WO | WO 2005/028289 A1 | * | 3/2005 |

* cited by examiner

*Primary Examiner* — Glenn Dayoan
*Assistant Examiner* — Paul A Chenevert

(57) ABSTRACT

A blank for a vehicle door includes components arranged in the form of a blank for a front door or a rear door, each component including an edge that is adjacent to an edge of another one of the components, and welds produced by a laser, connecting the components along weld lines at the adjacent edges, each weld line of the blank for a front door being collinear with a corresponding weld line of the blank for a rear door.

15 Claims, 2 Drawing Sheets

WELDED BLANK FOR VEHICLE DOOR PANEL

CROSS REFERENCE TO RELATED APPLICATIONS

This application claims priority to and the benefit of U.S. Provisional Application No. 61/090,741, filed Aug. 21, 2008, the full disclosure of which is incorporated herein by reference.

BACKGROUND OF INVENTION

The present invention relates generally to the production of doors for a motor vehicle, and more particularly to a welded blank, from which a panel for a front door or rear door is produced.

Application of linear-welded blanks for the inner panel of front and rear doors for a motor vehicle results in undesirable distribution of material and inefficient material utilization. Consequently, unnecessary material is present on the J-plane of the door inner, which significantly increases the weight of the door.

Currently, tailor-welded blanks (TWB) for front and rear doors of the same vehicle do not share common characteristics and are sourced separately from TWB suppliers with no opportunity for the supplier to share investment costs of tooling between tailor-welded blanks of the front and rear doors of the same vehicle.

Current tailor-welded blanks for front and rear doors of the same vehicle type, i.e., small car, mid-size car, full-size car or truck, do not share common characteristics that can be used to provide for reuse of existing manufacturing lines.

A need exists in the industry for a multiple-piece, welded door panel blank that can be applied to both the front and rear door of automotive vehicles, including doors for differing vehicle architectures. Preferably the components of each blank would be welded along straight and curved lines, each of which is collinear with a corresponding weld line of another blank whether for a front or rear door, although the length of the weld lines can vary.

SUMMARY OF INVENTION

A blank for a vehicle door includes components arranged in the form of a blank for a front door or a rear door, each component including an edge that is adjacent to an edge of another one of the components, and welds produced by a laser, connecting the components along weld lines at the adjacent edges, each weld line of the blank for a front door being collinear with a corresponding weld line of the blank for a rear door.

The invention further contemplates a method for producing a blank for a vehicle door. Components for front doors and rear doors are formed of sheet stock having edges, with adjacent edges of components for a front door being collinear with corresponding adjacent edges of components for a rear door. An edge of one of the components is arranged adjacent to an edge of another one of the components to form a blank for a front door or a rear door. The components are interconnected by welding the adjacent edges.

The standardized weld line geometry minimizes weight, optimizes material usage, and reduces the piece cost of each blank. The supplier's investment for tooling is applicable to multiple tailor-welded blanks using the identical weld configuration, even though the periphery of the blanks may be different.

Subsequent car model programs having the same vehicle architecture provide greater potential for reuse of existing tailor-welded blank manufacturing lines. Using identical weld line geometries across different model programs allows the supplier to reuse the same manufacturing hardware by changing the perimeter gauging used to qualify the blank pieces and position them in the weld fixture. Re-use of manufacturing lines, in this manner, significantly reduces the piece cost per blank for each subsequent car or truck program.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
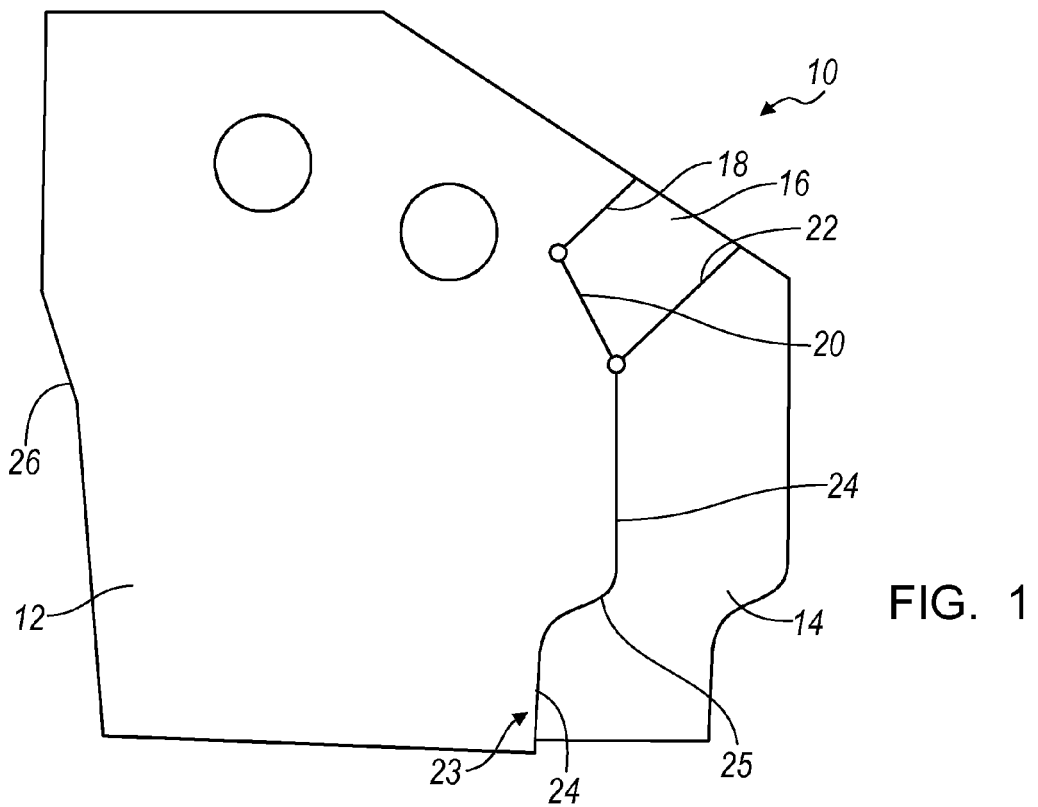
FIG. 1 is a top view of a three-piece door blank prior to being stamped for use as the front door of a vehicle.

Referring now to the drawings, there is illustrated in FIG. 1 a tailor-welded door blank 10 comprising three components 12, 14, 16, which are joined mutually by welding along weld lines to form a unitary, one-piece blank 10. Preferably each component 12, 14, 16 is a flat, thin sheet of steel or another weldable material. Component 12 is welded along straight weld lines 18, 20 to component 16. Component 14 is welded along straight weld line 22 to component 16 and along a weld line 23 to component 12. Weld line 23 is a composite of straight weld lines 24 and curved or arcuate weld lines 25.

The periphery 26 of blank 10 is trimmed to produce a shape that is suitable for use as the inner panel for a vehicle front door.

Figure 2:
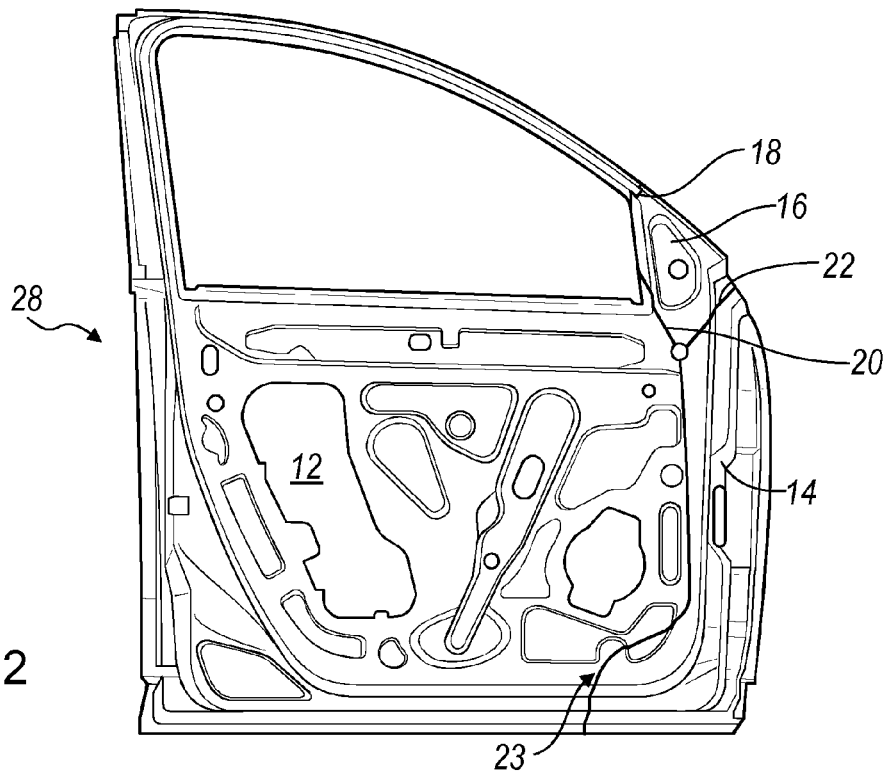
FIG. 2 is a side view of a front door inner panel stamped from the blank of FIG. 1.

FIG. 2 is a side view of a front door inner panel 28, which has been stamped from the blank 10 of FIG. 1. FIG. 2 shows the location of the weld lines 18, 20, 22, 23 after panel 28 has been stamped.

Figure 3:
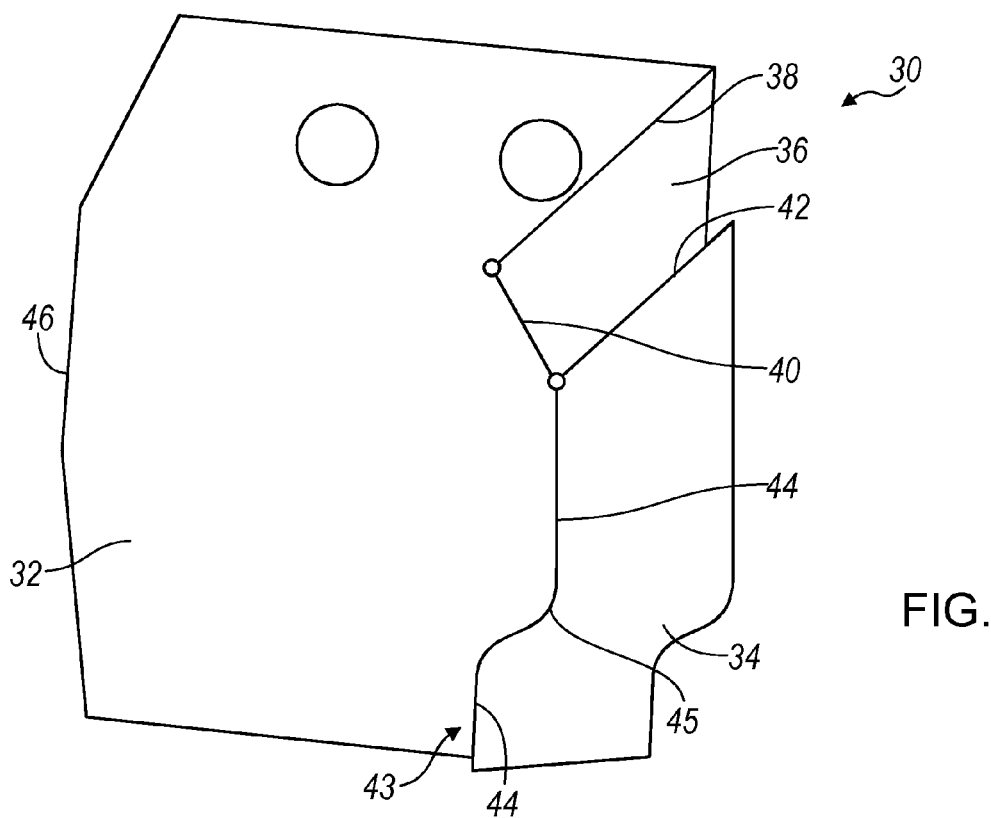
FIG. 3 is a top view of a three-piece door blank prior to being stamped for use as the rear door of a vehicle.

FIG. 3 illustrates a tailor-welded door blank 30 comprising three components 32, 34, 36, which are joined mutually by welding along weld lines to form a unitary, one-piece blank 30. Preferably each component 32, 34, 36 is a flat, thin sheet of steel or another weldable material. Component 32 is welded along straight weld lines 38, 40 to component 36. Component 34 is welded along straight weld line 42 to component 36 and along a weld line 43 to component 32. Weld line 38 is parallel to and longer than weld line 18. Weld line 43 is a composite of straight weld lines 44 and a curved or arcuate weld line 45.

A line segment is a part of a line that is bounded by two distinct end points, and contains every point on the line between its end points. As used in the description of this invention and the claims, if a first weld line contains every point on a second weld line, the first and second weld lines are collinear, whether the weld lines are straight or curved, and whether the lengths of the weld lines are equal.

Weld line 20 is collinear with weld line 40 and preferably has the same length as weld line 40. Weld line 42 is collinear with weld line 22, but it is longer than weld line 22. Weld line 38 is collinear with weld line 18, but it is longer than weld line 18. Weld line 43 is collinear with weld line 23, although those weld lines include straight and curved segments.

The periphery 46 of blank 30 is trimmed to produce a shape that is suitable for use as the inner panel for a vehicle rear door.

Figure 4:
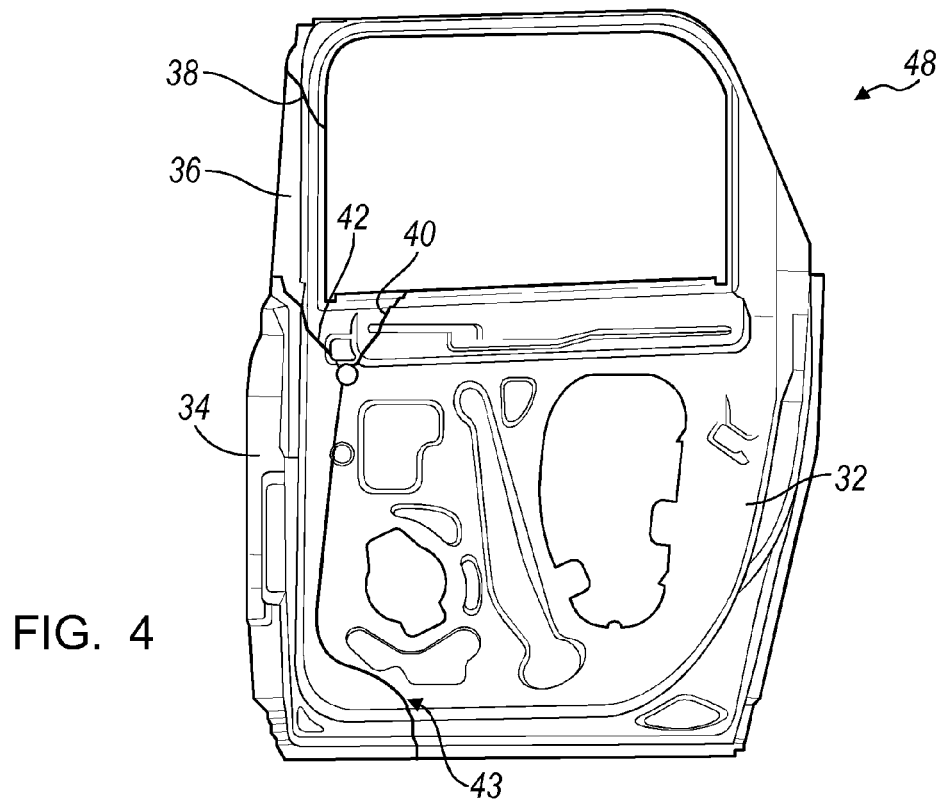
FIG. 4 is a side view of a rear door inner panel stamped from the blank of FIG. 3.

FIG. 4 is a side view of a rear door inner panel 48, which has been stamped from the blank 30 of FIG. 3. FIG. 4 shows the location of the weld lines 38, 40, 42, 43 after the panel 48 has been stamped.

The manufacturing tool used to produce blanks 10 and 30 is substantially identical except for different perimeter gauging used to adjust for the different perimeters of the blanks 10, 30 of front and rear door applications. After the components that comprise the blanks 10, 30 are installed in the welding tool, a welder, preferably a laser beam, follows the same path along each weld line at the adjacent, abutting edges of the components pieces, forming welds that extend through the thickness of the components and along the length of the weld lines, producing a unitary, one-piece blank 10, 30.

Each blank is then stamped to produce the inner panel 28, 48 for either a front door, as shown in FIG. 2, or a rear door, as shown in FIG. 4.

Using identical weld lines geometry across different model programs allows reuse of the same TWB manufacturing equipment by changing the perimeter gauging that is used to quantify the blank components and positioning the blank components in a weld fixture.

While certain embodiments of the present invention have been described in detail, those familiar with the art to which this invention relates will recognize various alternative designs and embodiments for practicing the invention as defined by the following claims.

What is claimed is:

1. Vehicle door blanks, comprising:
   first components arranged in the form of a first blank having a periphery for a front door, each component including an edge that abuts an edge of another one of the first components;
   second components arranged in the form of a second blank having a periphery for a rear door, said periphery being different from the periphery for the front door, each second component including an edge that abuts an edge of another one of the second components; and
   welds interconnecting the first components along weld lines at the respective abutting edges and interconnecting the second components along weld lines at the respective abutting edges, each weld line of the first blank being collinear with a corresponding weld line of the second blank.

2. The blanks of claim 1 wherein the components are of sheet metal.

3. The blanks of claim 1 wherein the each welded blank is in one-piece.

4. The blanks of claim 1 wherein the welds are substantially continuous along each weld line and extend through a thickness of the components.

5. The blanks of claim 1 wherein the weld lines are straight lines and curved lines.

6. Vehicle door blanks, comprising:
   first components arranged in the form of a first blank for a front door, each component including an edge that is adjacent an edge of another one of the first components;
   second components arranged in the form of a second blank having a periphery for a rear door, said periphery being different from the periphery for the front door, each second component including an edge that is adjacent an edge of another one of the second components; and
   welds produced by a laser, connecting the first components along weld lines at the adjacent edges and connecting the second components along weld lines at the adjacent edges, each weld line of the first blank being collinear with a corresponding weld line of the second blank.

7. The blanks of claim 6 wherein the components are of sheet metal.

8. The blanks of claim 6 wherein each welded blank is in one-piece.

9. The blanks of claim 6 wherein the welds are substantially continuous along each weld line and extend through a thickness of the components.

10. The blanks of claim 6 wherein the weld lines are straight lines and curved lines.

11. A method for producing a blanks for vehicle doors comprising the steps of:
   (a) forming first and second components for front doors blanks and rear doors blanks, respectively, of sheet stock having edges, a periphery of the front door blank being different from a periphery of the rear door blank;
   (b) arranging the edge of each first component adjacent to a corresponding edge to form a front door blank;
   (c) arranging the edge of each second component adjacent to a corresponding edge to form a rear door blank, such that the adjacent edges of the second components are collinear with corresponding adjacent edges of the front door blank; and
   (d) interconnecting the first components to form a front door blank, and interconnecting the second components to form a rear door blank by welding the adjacent edges together.

12. The method of claim 11 further comprising the step of stamping the blanks to form a door panel.

13. The method of claim 11 further comprising the step of stamping the blanks to form a periphery and a window opening of an inside panel for a door panel.

14. The method of claim 11 wherein step (d) further includes forming the blank by laser welding the adjacent edges.

15. The method of claim 11 wherein steps (a) and (b) further includes forming the component having edges that are straight lines and curved lines.

* * * * *